United States Patent Office 3,108,484
Patented Oct. 29, 1963

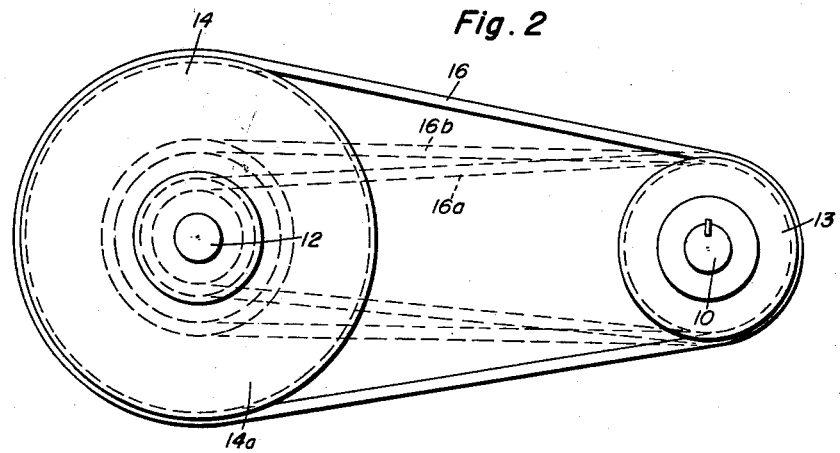
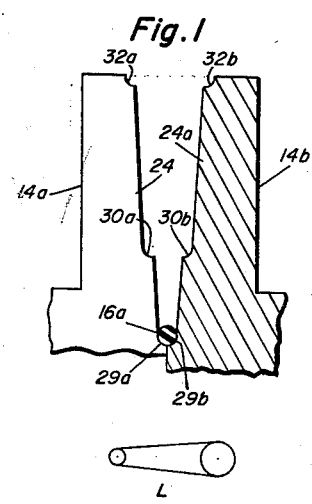
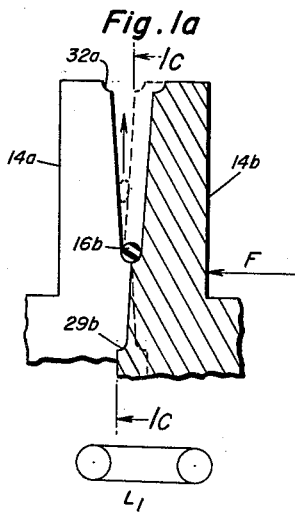
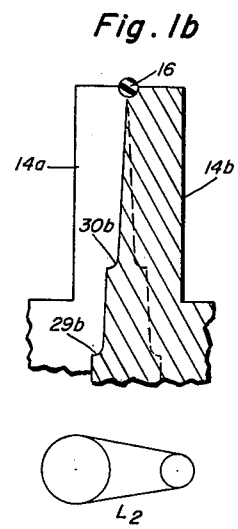
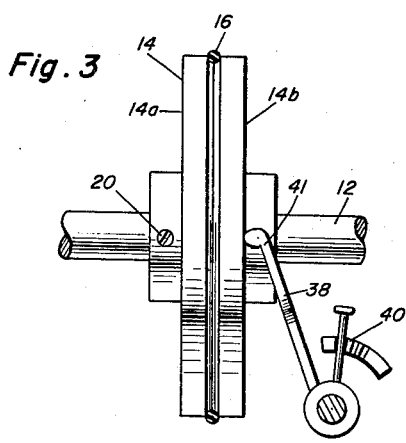
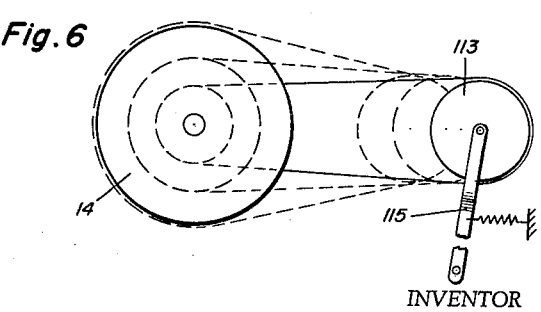
INVENTOR
Jacob Rabinow
BY Joseph A. Genovese &
Max L. Libman
ATTORNEYS Oct. 29, 1963 J. RABINOW 3,108,484
ADJUSTABLE PULLEY
Filed Oct. 26, 1961 2 Sheets-Sheet 2
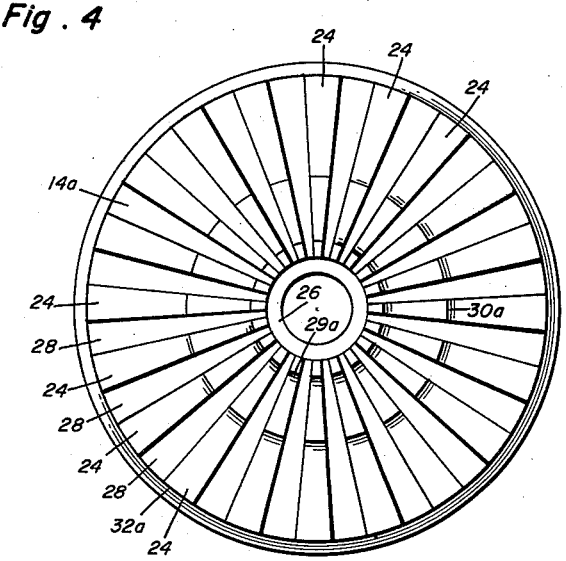
Fig. 4
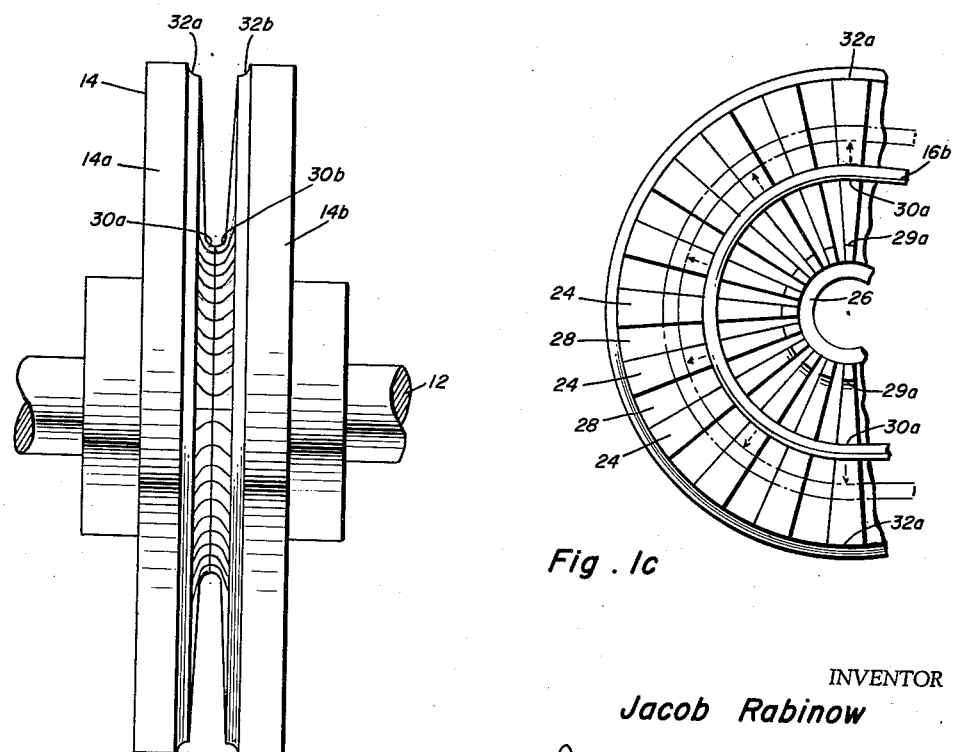
Fig. 5
Fig. 1c
INVENTOR
Jacob Rabinow
BY Joseph A. Genovese &
Max L. Libman
ATTORNEYS

3,108,484
ADJUSTABLE PULLEY
Jacob Rabinow, Takoma Park, Md., assignor to Rabinow Engineering Co., Inc., Takoma Park, Md.
Filed Oct. 26, 1961, Ser. No. 147,953
13 Claims. (Cl. 74—230.17)

This invention relates to speed-change, belt-and-pulley transmission systems, and particularly to an adjustable pulley used therewith, to require speed changes in definite, predetermined steps in contrast to infinitely variable transmissions which can operate at many different ratios within a given parameter.

There are numerous examples of variable speed transmissions using adjustable pulleys. For example, U.S. Patents No: 2,593,163, 2,546,856, 2,313,436, and 2,013,268 disclose in each case, a variable speed transmission using a pair of pulleys, one of which (at least) is infinitely variable between effective maximum and minimum diameters by axially adjusting one of the pulley sections with respect to the other. My invention pertains to this general class of subject matter, but serves a function not easily capable of being performed by infinitely variable speed transmissions such as disclosed in the prior patents.

Infinitely variable speed transmissions using a pulley-belt system, serve their intended purpose well. There are some instances, however, where such pulley systems are not easily used, for example, in mechanisms, devices, etc. where the output speed should or must be a definite, predetermined ratio with respect to the power driver. In general, all mechanisms which should operate at definite synchronized speeds cannot use infinitely variable speed transmission devices because it is almost impossible to obtain exact adjustment and furthermore, a small amount of wear of the belt between pulleys will change the speed ratios. Specifically, the turntable of a record player should operate at 78 r.p.m., 45 r.p.m., 33⅓ r.p.m., or 16⅔ r.p.m. These speeds should be established and maintained, and the owner of the record player ordinarily has no interest whatsoever in having the turntable operate at any speed other than these. In fact, if the record player should operate at speeds other than these, such would be considered a defect. The same is true of magnetic tape recorders, although the conventional speeds are different from disc recorders. Another specific example of the desirability of speed changing in definite steps is anywhere in a synchronous feeder-conveyor system where articles handled by the system must be synchronously handled. These examples are certainly not exhaustive but are given simply to show that in some applications, infinitely variable speed transmission systems are not as satisfactory as variable speed transmission systems whose ratios are exactly predictable. Of course, gear speed changers meet this requirement, but they are comparatively expensive and, unless very well made, noisy.

Accordingly, the broad objective of my invention is to provide a variable speed transmission of the belt-pulley type where the speed ratios are exactly predeterminable, the ratios being changed in definite steps and not to uncertain ratios such as is inherent in infinitely variable belt-pulley transmissions.

Another objective of my invention is to provide an adjustable pulley whose effective diameter is adjustable in steps as opposed to gradual adjustment such as ordinarily found in variable speed pulleys.

Infinitely variable speed transmissions systems which use variable pulleys generally rely on V belts because they have inherent advantages over belts of other cross sections. One advantage is that a V belt does not appreciably stretch. In fact, some of the better V belts for industrial and commercial use have embedded metal strands to prevent stretching. The non-stretching feature of V belts makes it necessary to compensate in some way for the length differences of the belt when the effective diameter of the adjustable pulley is altered. A typical example of this is found in U.S. Patent No. 2,546,856. On the other hand, one form of my invention relies on the ability of the belt to stretch and contract when the output speed of my transmission is stepped. Ordinary O rings made of rubber and/or a synthetic elastomeric material are commercially available, which are capable of elongation up to 28% of the original length (manufacturers specifications) without acquiring a permanent set or otherwise failing.

Accordingly, one of the features of my invention is the combination of an adjustable pulley with an extensible belt where the inherent elasticity of the belt is used to cause adjustment of the pulley in one direction, i.e., when the effective diameter of the pulley is large and is stepped down to a smaller effective diameter. Thus, in all variable speed transmissions of the general class under consideration and of which I am aware, the problem of belt-stretch is present but in my invention it is not a problem at all and in fact, is utilized to good advantage. A very important result of this is that in one embodiment, my system requires no means to compensate for the different belt-lengths when the transmission is stepped to the various speed ratio positions.

Other objects and features of importance will become apparent in following the description of the illustrated form of the invention.

FIGURE 1 is a fragmentary sectional view of the adjustable pulley of my transmission system showing the belt in one position and also a given belt length for a transmission.

FIGURE 1a is a diagrammatic view similar to FIGURE 1 but showing the adjustable pulley in a second position, the view also showing in dotted lines the pulley in the process of adjustment, and also the increase in belt-length.

FIGURE 1b is a sectional view similar to FIGURE 1 and 1a but showing the pulley adjusted to a position at which the belt is of maximum length.

FIGURE 1c is a view taken on the line 1c—1c of FIGURE 1a.

FIGURE 2 is a side elevational view of a stepped-speed transmission system in accordance with the invention, this view showing in dotted lines the belt in different driving positions such as it would appear when the transmission system is adjusted to three different ratios.

FIGURE 3 is an elevational view of the pulley in FIGURE 2, and also a device for causing the belt to step to the various effective-diameter positions of the adjustable pulley.

FIGURE 4 is a front view of one section of a pulley in FIGURE 3.

FIGURE 5 is an enlarged side elevational view similar to FIGURE 3 but showing the pulley in a different adjusted position.

FIGURE 6 is a schematic view showing my pulley used in a system where the belt does not stretch, and effective length differences are compensated by conventional means.

FIGURE 2 shows my belt-pulley transmissions system. There are shafts 10 and 12 respectively which, for the purpose of identification, are called power input and power output shafts respectively. Pulley 13 on shaft 10 is turned by a power source (not shown) at a predetermined ratio of the input speed, depending on the adjustment of pulley 14. An elastic belt 16 is engaged with the pulley 13 and with pulley 14 which is attached to shaft 12 by conventional means, e.g., a key or set screw 20 (FIGURE 3). As shown in FIGURE 3 the set screw is attached to only one section 14a of the pulley, and the other section 14b is axially slidable on shaft 12 as will be described more fully later. In general, when the sections 14a and 14b are spread apart (FIGURES 1 and 2) belt 16 assumes position 16a (FIGURE 2) so that the effective diameter of pulley 14 is such as to yield an output speed of shaft 12 which bears a definite, known relationship to the speed of shaft 10. When the sections of pulley 14 are adjusted closer together (FIGURES 1a and 2) belt 16 assumes position 16b so that the effective diameter of pulley 14 is enlarged and consequently, the speed of shaft 10 is changed (reduced). The final adjustment of pulley 14 (FIGURES 1b and 2) is such that the belt assumes the position shown in full lines in FIGURE 2 so that a different speed ratio results. The important features described to this point are that the belt 16 shifts in steps from positions 16a to 16b to 16. Further, there are no means shown nor required (in this form of my invention) to compensate for the different belt lengths (L, $L_1$, and $L_2$, FIGURES 1–1b) between pulleys 13 and 14 as the belt must increase in length.

FIGURE 4 shows section 14a of pulley 14, and section 14b is identical except that one of the sections has provision for a set screw or the equivalent and the other does not; or if it has such a provision (to make the sections identical) it is not used at the same time as the other. Under special conditions it may be desirable to temporarily (or permanently) use the adjustable pulley as a fixed-diameter pulley. In such a case, both sections 14a and 14b can be secured to the shaft. Pulley section 14a is made of a circular plate having a group of radial ribs 24 which are longitudinally tapered from their wider peripheral ends to the inner ends which terminate at the hub 26 of the pulley section. Ribs 24 are uniformly spaced leaving or defining radial slots 28 between every adjacent pair of ribs. Thus, the ribs 24 of section 14a fit in the corresponding slots of section 14b and conversely, the ribs of section 14b are interleaved in slots 28 when the pulley sections are assembled.

Each rib has a shoulder formed on its face at a predetermined radial distance from the center of the pulley section. Thus, all of the inner shoulders 29a and 29b of sections 14a and 14b cooperate to form a belt land within the pulley. FIGURES 1 and 4 show shoulders 29a, 30a and 32a on each rib 24, and all corresponding shoulders are spaced a predetermined radial distance from the axis of rotation of the pulley section 14a. Pulley section 14b, being identically constructed, has groups of shoulders 29b, 30b, and 32b in ribs 28b corresponding to shoulders 29a, 30a and 32a ribs. Consequently the groups of shoulders establish three stepped positions for the belt 16. It is understood that the pulley 14 is for three speed changes but this number can be increased or decreased by using additional sets of shoulders or only two sets of shoulders, respectively.

The front faces of ribs 24 are sloped, e.g., by making the inner portions thicker than the outer portions. This condition is shown exaggerated in FIGURES 1–1b. The purpose of the slope is to provide a wedging action on the belt as shown in dotted lines in FIGURE 1a when the belt is adjusted from an inner land to an outer land, regardless of the number of available lands in the pulley. The shoulders forming the lands between adjacent sloped portions of each rib are curved, i.e., faired. It is not necessary that the shoulders be faired although this configuration is preferred because the belt 16 is more easily squeezed or wedged off the shoulders when the pulley is adjusted from a smaller to a larger effective diameter.

The operation of pulley 14 in adjusting the effective diameter from smaller to a larger is shown pictorially in FIGURE 1c and FIGURE 3. FIGURE 3 shows a conventional yoke 38 bearing against the outer face of pulley section 14b and a suitable latch, mechanism 40, to lock the yoke in a selected position with its fork 41 near or away from the outer surface of section 14b. Assume for the purpose of explanation that belt 16 is on the land formed by shoulders 29a and 29b as shown in FIGURE 1, and the full belt length is L. When it is desired to change speed, a force F is applied to section 14b (FIGURE 1a) in the direction of the arrow. The force F may be obtained in any way, such as shown in FIGURE 3, by a solenoid, etc. Regardless of the origin of the source F, its purpose is to move section 14b axially toward section 14a. If this is done while the pulley 14 is rotating, the width of the land 29a, 29b decreases and the belt 16 is wedged therefrom and moves toward and onto the land 30, 30a (FIGURE 1a). The mechanics involved are explained below. Now assume that further adjustment is desired to move the belt from land 30, 30a to land 32, 32a. Force F is again applied (FIGURE 1a) causing the ribs of the sections 14a and 14b to become more deeply interlaced whereby the land 30, 30a becomes narrower and wedges the belt between the sloping, confronting parts of the ribs between lands 30, 30a and 32, 32a. The wedging action on the belt is obtained by the slope of the confronting faces of ribs 24 and 24a between adjacent lands. The friction between the surface of belt 16 and the sloping faces of the ribs during the rotation of the pulley causes the belt 16 to move radially outward in the direction of the arrows shown in FIGURE 1c and the arrows shown in FIGURE 1a. The elasticity of the belt is relied on to enable the belt to stretch while it is being elongated ($L_1$ to $L_2$) during the transition between the position shown in FIGURE 1a and that in FIGURE 1b. Ultimately (usually in less than a revolution of the pulley), the belt 16 reaches the outer land 32, 32a and seats thereon.

I previously indicated that the inherent elasticity of belt 16 is relied on to shift the belt from the position shown in FIGURE 1b to the position shown in FIGURE 1a or to any other of the stepped positions where the effective diameter of pulley 14 is decreased. The belt length $L_2$ (FIGURE 1b) is assumed to be maximum, meaning that the belt has stretched and stored considerable potential energy due to the stretch. Thus, when mechanism 40 or the like, is adjusted from the position shown in FIGURE 3 to another of its steps, the outer land of the pulley opens sufficiently to allow the belt 16 to come between the opposing sloping surfaces of ribs 24 and 24a. Thus, the belt is now able to expend some of the above mentioned stored potential energy by contracting. The belt contracts, spreading sections 14a and 14b until it engages the next adjacent land 30, 30a. Here again, the action of the belt contracting from the position shown in FIGURE 1a (or any other inward position) is fast and can be achieved in less than a single revolution of the pulley. The adjustment of the pulley from the position shown in FIGURE 1a to that of FIGURE 1 is achieved in exactly the same way.

Since my pulley can be used as a part of a transmission system which relies on belt stretch for speed-change (described previously), and also used in other capacities, I have shown my pulley 14 as a part of an otherwise conventional speed-change system in FIGURE 6. In this view the pulley 113, corresponding to pulley 13 of FIGURE 2, is mounted on a swingable support 115 which moves, or is moved by conventional means (not shown) to compensate for changes in effective belt length. The previously referred to patents show other ways of belt length compensation made necessary by changing the effective diameter of an adjustable-diameter pulley. Thus, when my pulley 14 is adjusted to a selected position, as by the adjusting means shown on FIGURE 3, the belt length changes are compensated. In using my pulley in this way, I can use a conventional "non-stretching" belt such as a V belt or the like, and it will move in step-fashion to the various lands of the pulley just as an O ring belt. When a V belt is used, the shoulders at the respective stages will, of course, be shaped accordingly.

It is understood that various changes and modifications in my design may be resorted to without departing from the protection of the following claims.

I claim:

1. A belt and pulley transmission which is adjustable in defined steps to provide predetermined speed ratios comprising a flexible elastic belt, and a pulley having a pair of sections with confronting faces, said faces defined by a plurality of radial ribs and slots on each section, said ribs and slots of each section being interlaced to drivingly connect said sections, said ribs of both sections having a first and a second set of shoulders which are radially spaced from the axis of the pulley, each pair of said sets of shoulders defining an annular land for said belt, and when in the land-defining position said shoulders bridging the space between sections to provide a seat for the inner surface of the belt, one of said sections being axially movable with respect to the other section and said belt being moved from one land to the other as one section is axially moved a distance sufficient to open said seat enough to allow the belt to pass thereby stepping the ratio of the transmission from one definite predetermined ratio to another.

2. The belt and pulley transmission of claim 1 wherein there is an intermediate land in said faces between the first-mentioned leads.

3. The belt and pulley transmission of claim 1 wherein said belt is elastic and the stored energy in said belt is relied on to axially move one section with respect to the other as said pulley is stepped down from a larger effective diameter to a smaller effective diameter.

4. A stepped-speed changer for a member whose speed is to be changed in definite steps with respect to the speed of an input member, said speed changer including an elastomeric endless element capable of appreciable elongation and contraction, a pulley having a pair of sections with one section axially movable toward and away from the other, means defining a smaller-diameter land and a larger-diameter land associated with said sections, said endless element engaged with said input member and with said smaller diameter land, and the endless element itself stretched to reach said larger-diameter land by the action of said sections coming together in response to the axial movement of one of said sections with respect to the other.

5. The stepped-speed changer of claim 4 wherein said endless element is an O ring capable of substantially elastic elongation of generally the order of five to twenty-five percent of original length.

6. In a speed changer which is adjustable in predetermined discrete steps, a first rotary member of a predetermined diameter, a second member and an endless elastic belt capable of appreciable elongation when stretched without exceeding its elastic limit or otherwise failing, said belt engaged with said members, said second member including a pair of sections, a shaft on which said sections are mounted, one of said sections being axially movable toward the other section, a part of said belt located between the confronting faces of said sections, means defining at least two lands at different radial distances from the axis of rotation of said second member, each land having a complemental portion on each face of said sections so that as one section is moved axially toward the other during the rotation of said second member said belt is wedged from one land toward the other with the stretch of said belt compensating for the different required length of said belt.

7. The speed changer of claim 6 wherein said sections have nested means in their faces which couple the sections for concurrent rotation, and said section faces are sloped outwardly toward the periphery of said second member, and the elasticity of said belt returning said belt to one land when said sections are again separated, and said belt return being as a step function from one land to the other.

8. An adjustable speed changer comprising a pulley whose effective diameter is changeable as a step function to provide definite predetermined speed changes in steps, and a flexible belt capable of appreciable elongation without taking a permanent set; said pulley comprising a first and a second pulley section having confronting faces which slope outwardly toward the periphery of the pulley, concentric lands on said sections at said faces, one land composed of surface portions of said confronting faces at an angle to the slope of said faces, another land composed of other surface portions of said faces at an angle to the slope of said faces, said lands being radially spaced from each other with parts of said sloping faces therebetween, said belt disposed between said confronting faces of said sections so that when said belt is on the inner land and said sections are moved toward each other said belt is wedged by the sloping faces and rotation of said sections to the outer land, and when said belt is on said outer land and said sections are begun to be separated a sufficient distance for the belt to leave said outer land and engage said sloping faces the belt moves along the faces of said sections inwardly of the pulley to said inner land so that the speed-change is in precise discrete steps.

9. In a belt and pulley speed changer wherein the pulley has a pair of axially adjustable sections with confronting faces defining a belt-groove, the improvement comprising means to change the effective diameter of the pulley by relying on energy stored in the belt to axially adjust the position of one of said sections and to compensate for different belt length requirements due to said adjustment by relying on the elongation and contraction of said belt, said means including a flexible elastic belt capable of being distended an appreciable percentage of its original length without exceeding the elastic limit of the belt, said belt disposed in said groove, said sections having confronting faces which slope away from each other radially outwardly of said sections, means to exert a force on one of said sections in a direction to axially move that section toward the other section thereby wedging the belt radially outwardly in said groove and elongating the belt and eliminating the necessity of belt-length compensation, said belt storing energy while being elongated, and said stored energy being available to return said axially moved section away from the other section when said force is removed with the result that the belt length requirement for a shorter belt is met by the contraction of the belt as the stored energy therein is expended in axially returning said axially moved section.

10. The speed changer of claim 9 wherein each of said section faces has lands at different radial distances from the axis of the pulley, each land forming an interruption in the slope of the face surface and bridging the space between said sections and forming a seat for the bottom of the belt when the belt is disposed thereon.

11. The speed changer of claim 10 wherein said sloping surfaces are formed by the outer surfaces of a plurality of ribs with spaces there-between and the ribs of one section being interlaced with the ribs of the other section so that said sections are coupled for rotation.

12. In a belt and pulley speed changer of the type having a first pulley on a fixed axis and a second pulley provided with sections with one section axially adjustable with respect to the other, and an endless belt engaged with said pulleys whereby speed-change is affected by the axial adjustment of one of said sections, an improvement enabling said axially adjustable section to be adjusted to different positions for speed-change without providing a mechanism to take-up slack in the belt, the improvement being contained in the construction of said second pulley which has sloping confronting faces, and means to interlock said sections for rotation, a shaft on which said sections are disposed, one section secured to said shaft and the second section axially movable on the shaft, said belt being flexible and sufficiently elastic to elongate more than five percent of its original length without acquiring a set, means to exert a force on said second section to axially move it toward the other section thereby wedging said belt radially outwardly of said second pulley and elongating the belt while storing energy in the belt, the stored energy in said belt returning said second section when said exerted force is removed, said faces having lands which bridge the space between section faces and provide a seat for the bottom of said belt, so that as said exerted force is being removed and the section begins to move away from the first section the seat begins to open but the belt remains thereon until the seat opens far enough for the belt to pass and occupy a more inward position whereby the speed change is in substantially exact increments.

13. An adjustable pulley comprising a first section and a second section, each section having a face provided with ribs with spaces therebetween, said ribs and spaces of said sections being interlaced to couple said sections for rotation but to allow the sections to be axially spaced and returned to alter the axial spacing between sections, said ribs of said sections having surfaces which slope away from each other toward the outer edges of said sections, the sloping surfaces being interrupted by shoulders which define lands to support a belt, said shoulders bridging the space between said sections so that the land defined by the shoulders forms a seat for the bottom of a belt enabling a belt to remain seated on the land during the initial axial movement of a section until that section is moved sufficiently to allow the bottom of the belt to move between the shoulders defining the land as it is being opened and contact and wedge-open adjacent sloping surface portions of said sections.

References Cited in the file of this patent

UNITED STATES PATENTS

| | | |
|---|---|---|
| 975,869 | Jones | Nov. 25, 1910 |
| 1,867,039 | Von Ohlsen | July 12, 1932 |
| 2,168,835 | Wells | Aug. 8, 1939 |
| 2,528,244 | Rawson | Oct. 31, 1950 |
| 2,892,354 | Amonsen | June 30, 1959 |

FOREIGN PATENTS

| | | |
|---|---|---|
| 5,320 | Great Britain | of 1912 |